United States Patent
Luft et al.

(10) Patent No.: US 9,888,376 B2
(45) Date of Patent: Feb. 6, 2018

(54) AUTONOMOUS ENHANCED NODE B

(71) Applicant: Intel IP Corporation, Santa Clara, CA (US)

(72) Inventors: Achim Luft, Braunschweig (DE); Muthaiah Venkatachalam, Beaverton, OR (US); Alexander Sirotkin, Petach Tikva (IL)

(73) Assignee: Intel IP Corporation, Santa Clara, CA (US)

(*) Notice: Subject to any disclaimer, the term of this patent is extended or adjusted under 35 U.S.C. 154(b) by 343 days.

(21) Appl. No.: 14/318,351

(22) Filed: Jun. 27, 2014

(65) Prior Publication Data

US 2015/0195706 A1 Jul. 9, 2015

Related U.S. Application Data

(60) Provisional application No. 61/924,194, filed on Jan. 6, 2014.

(51) Int. Cl.
*H04L 12/26* (2006.01)
*H04W 8/30* (2009.01)
(Continued)

(52) U.S. Cl.
CPC ............ *H04W 8/30* (2013.01); *H04W 4/22* (2013.01); *H04W 24/02* (2013.01); *H04W 24/04* (2013.01);
(Continued)

(58) Field of Classification Search
CPC ...... H04L 69/40; H04L 12/26; H04W 76/028; H04W 8/30; H04W 88/16; H04W 24/02; H04W 36/0055
(Continued)

(56) References Cited

U.S. PATENT DOCUMENTS

| | | | |
|---|---|---|---|
| 8,098,590 B2 | 1/2012 | Catovic et al. | |
| 8,649,323 B2* | 2/2014 | Iwamura | H04W 24/02 370/328 |

(Continued)

FOREIGN PATENT DOCUMENTS

| | | |
|---|---|---|
| CN | 102387510 A | 3/2012 |
| CN | 02939777 A | 2/2013 |

(Continued)

OTHER PUBLICATIONS

"U.S. Appl. No. 14/318,076, Restriction Requirement dated Sep. 25, 2015", 5 pgs.

(Continued)

*Primary Examiner* — Ricky Ngo
*Assistant Examiner* — Dewanda Samuel
(74) *Attorney, Agent, or Firm* — Schwegman Lundberg & Woessner, P.A.

(57) ABSTRACT

Embodiments allow one or more eNBs that become isolated from core network entities (e.g., evolved packet core entities such as mobility management entity, serving gate way, packet data network gateway, and so forth) to form a resilient mode network. Such a network can function in a limited fashion and provide for UE to UE communications within the resilient mode network coverage area. One or more of the eNBs function as an autonomous eNB and provide a subset of core network functions that allow UE to UE communications within the resilient mode network coverage area. Embodiments disclosed herein select which eNB functions as the autonomous eNB and then the other eNBs establish an S1-MME and/or S1-U interface with the autonomous eNB.

18 Claims, 9 Drawing Sheets

(51) Int. Cl.
*H04W 24/02* (2009.01)
*H04W 24/04* (2009.01)
*H04W 4/22* (2009.01)
*H04W 76/00* (2009.01)
*H04W 88/16* (2009.01)
*H04W 84/20* (2009.01)

(52) U.S. Cl.
CPC .......... *H04W 76/007* (2013.01); *H04W 84/20* (2013.01); *H04W 88/16* (2013.01)

(58) Field of Classification Search
USPC .................................. 370/217, 331, 242, 401
See application file for complete search history.

(56) References Cited

U.S. PATENT DOCUMENTS

| | | | | |
|---|---|---|---|---|
| 8,711,709 | B2* | 4/2014 | Marinier | H04W 72/02 370/254 |
| 8,774,790 | B2* | 7/2014 | Asthana | H04M 3/12 455/418 |
| 8,842,638 | B2* | 9/2014 | Zhang | H04W 8/20 370/331 |
| 9,473,907 | B2* | 10/2016 | Van Phan | H04W 4/08 |
| 9,510,314 | B2 | 11/2016 | Schmidt et al. | |
| 2003/0028635 | A1* | 2/2003 | DeMent | H04Q 3/0025 709/225 |
| 2006/0209828 | A1* | 9/2006 | Ng | H04L 63/04 370/392 |
| 2007/0019769 | A1 | 1/2007 | Green et al. | |
| 2007/0155375 | A1* | 7/2007 | Kappel | H04W 24/04 455/422.1 |
| 2007/0298806 | A1 | 12/2007 | Venkatachalam | |
| 2008/0080399 | A1* | 4/2008 | Wang | H04W 24/02 370/254 |
| 2008/0171569 | A1* | 7/2008 | Pralle | H04B 1/74 455/525 |
| 2009/0049152 | A1* | 2/2009 | Rimhagen | H04W 24/08 709/209 |
| 2009/0310501 | A1 | 12/2009 | Catovic | |
| 2010/0039991 | A1* | 2/2010 | Godin | H04W 24/02 370/328 |
| 2010/0323723 | A1 | 12/2010 | Gerstenberger et al. | |
| 2011/0141946 | A1* | 6/2011 | Ostrup | H04L 41/0816 370/254 |
| 2011/0201279 | A1 | 8/2011 | Suzuki et al. | |
| 2011/0218003 | A1* | 9/2011 | Qiu | H04W 36/02 455/507 |
| 2011/0250880 | A1 | 10/2011 | Olsson | |
| 2012/0129522 | A1 | 5/2012 | Kim et al. | |
| 2012/0309395 | A1* | 12/2012 | Centonza | H04W 84/045 455/436 |
| 2013/0090126 | A1 | 4/2013 | Xing et al. | |
| 2014/0003328 | A1* | 1/2014 | Mildh | H04W 72/048 370/315 |
| 2015/0023153 | A1* | 1/2015 | Kashiwase | H04W 8/082 370/221 |
| 2015/0023250 | A1* | 1/2015 | Xu | H04W 8/26 370/328 |
| 2015/0131578 | A1* | 5/2015 | Baek | H04B 7/024 370/329 |
| 2015/0195805 | A1 | 7/2015 | Schmidt et al. | |

FOREIGN PATENT DOCUMENTS

| | | |
|---|---|---|
| CN | 103369571 A | 10/2013 |
| CN | 105794308 A | 7/2016 |
| CN | 105993189 A | 10/2016 |
| CN | 106231628 A | 12/2016 |
| JP | 2004333414 A | 11/2004 |
| JP | 2011525326 A | 9/2011 |
| JP | 2017085543 A | 5/2017 |
| KR | 1020160082694 A | 7/2016 |
| TW | 201536069 A | 9/1951 |
| TW | I544817 B | 8/2016 |
| TW | 201701689 A | 1/2017 |
| WO | WO-2012031552 A1 | 3/2012 |
| WO | WO-2012155731 A1 | 11/2012 |
| WO | WO-2013048331 A1 | 4/2013 |
| WO | WO-2013109080 A1 | 7/2013 |
| WO | WO-2013191506 A1 | 12/2013 |
| WO | WO-2015102811 A1 | 7/2015 |
| WO | WO-2015102812 A1 | 7/2015 |

OTHER PUBLICATIONS

"International Application Serial No. PCT/US2014/068847, International Search Report dated Mar. 23, 2015", 3 pgs.

"International Application Serial No. PCT/US2014/068847, Written Opinion dated Mar. 23, 2015", 4 pgs.

"International Application Serial No. PCT/US2014/068888, International Search Report dated Mar. 24, 2015", 3 pgs.

"International Application Serial No. PCT/US2014/068888, Written Opinion dated Mar. 24, 2015", 5 pgs.

U.S. Appl. No. 14/318,076, filed Jun. 27, 2014, Method and Evolved Node-B for Geographic Bin Data Collection and Reporting.

"U.S. Appl. No. 14/318,076, Non Final Office Action dated Jan. 20, 2016", 8 pgs.

"U.S. Appl. No. 14/318,076, Response dated Apr. 19, 2016 to Non Final Office Action dated Jan. 20, 2016", 13 pgs.

"U.S. Appl. No. 14/318,076, Response dated Nov. 20, 2015 to Restriction Requirment dated Sep. 25, 2015", 10 pgs.

"International Application Serial No. PCT/US2014/068847, International Preliminary Report on Patentability dated Jul. 21, 2016", 6 pgs.

"International Application Serial No. PCT/US2014/068888, International Preliminary Report on Patentability dated Jul. 21, 2016", 7 pgs.

"Taiwanese Application Serial No. 103142203, Office Action dated Nov. 26, 2015", W/ English Translation, 16 pgs.

"Taiwanese Application Serial No. 103142203, Response dated Feb. 4, 2016 to Office Action dated Nov. 26, 2015", 16 pgs.

"U.S. Appl. No. 14/318,076, Notice of Allowance dated Jul. 27, 2016", 7 pgs.

"3rd Generation Partnership Project; Technical Specification Group Services and System Aspects; Telecommunication management; Study on NM Centralized Coverage and Capacity Optimization (CCO) SON Function (Release 12)", 3GPP TR 32.836 V1.1.0, [Online] retrieved from the internet: <http://www.3gpp.org/ftp/Specs/archive/32_series/32.836/>, (Oct. 19, 2013), 26 pgs.

"3rd Generation Partnership Project; Technical Specification Group Services and System Aspects; Telecommunication management; Subscriber and equipment trace; Trace control and configuration management (Release 12)", 3GPP TS 32.422 V120.0,, [Online] retrieved from the internet: <http://www.3gpp.org/ftp/Specs/archive/32_series/32.422/>, (Dec. 20, 2013), 134 pgs.

"European Application Serial No. 14877334.4, Extended European Search Report dated Jul. 13, 2017", 7 pgs.

"Japanese Application Serial No. 2016-141403, Office Action dated May 16, 2017", (W/ English Translation), 7 pgs.

"Japanese Application Serial No. 2016-534729, Office Action dated May 16, 2017", W/ English Translation, 5 pgs.

"Korean Application Serial No. 2016-7014910, Office Action dated Mar. 22, 2017", With English Translation, 6 pgs.

"Korean Application Serial No. 2016-7014910, Response dated May 22, 2017 to Office Action dated Mar. 22, 2017", (W/ English Claims), 11 pgs.

"Korean Application Serial No. 2016-7020761, Office Action dated Mar. 22, 2017", With English Translation, 17 pgs.

"Korean Application Serial No. 2016-7020761, Response dated May 22, 2017 to Office Action dated Mar. 22, 2017", (W/ English Claims), 20 pgs.

"Taiwanese Application Serial No. 105116276, Office Action dated Jul. 21, 2017", W/ English Translation, 25 pgs.

(56) References Cited

OTHER PUBLICATIONS

Intel, et al., "pCR EUTRAN UE distribution measurement", 3GPP TSG SA WG5 Meeting #89, S5-130904, [Online] retrieved from the internet: <http://www.3gpp.org/ftp/tsg_sa/WG5_TM/ TSGS5_89/ Docs>, (May 2013), 5 pgs.
"Japanese Application Serial No. 2016-141403, Response dated Sep. 4, 2017 to Office Action dated May 16, 2017", (W/ English Claims), 16 pgs.
"Japanese Application Serial No. 2016-534729, Response dated Aug. 15, 2017 to Office Action dated May 16, 2017", (W/ English Claims), 19 pgs.
U.S. Appl. No. 15/185,994, filed Jun. 17, 2016, Method and Evolved Node-B for Geographic Bin Data Collection and Reporting.

* cited by examiner

AUTONOMOUS ENHANCED NODE B

This application claims the benefit of priority under 35 U.S.C. 119(e) to U.S. Provisional Patent Application Ser. No. 61/924,194, filed on Jan. 6, 2014, which is incorporated herein by reference in its entirety.

TECHNICAL FIELD

Embodiments pertain wireless communications and more specifically operating an Enhanced Node B (eNB) in an autonomous mode when elements of the core network are unavailable.

BACKGROUND

Enhanced node B (eNB) that are part of current evolved universal mobile telecommunication system (UTMS) Terrestrial Radio Access Networks (E-UTRAN) must be connected to core network (e.g., evolved packet core) elements in order to service user equipment (UE). eNBs that are isolated from core network elements are unable to function and provide service to UE.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

When connection to core network (CN) elements are lost, embodiments described herein begin operating in a resilient mode that allows such a resilient mode network to serve UE in some fashion even though connection to the CN is unavailable. Such a resilient mode allows service, for example, to public safety devices in the event of a disaster that isolates one or more Enhanced NodeBs (eNBs) from the CN. Even though the devices may not be able to communicate with users/UE outside of the resilient mode network (e.g., isolated E-UTRAN) coverage area, the UE in the resilient mode network area will still be able to communicate with each other. The usage of isolated E-UTRAN may have better reliability and coverage than device-to-device communication, particularly if the area is large. Furthermore, providing alternate mode of communication in the event of a disaster or other event that isolates a portion of the E-UTRAN increases safety and reliability of communications.

Figure 1:
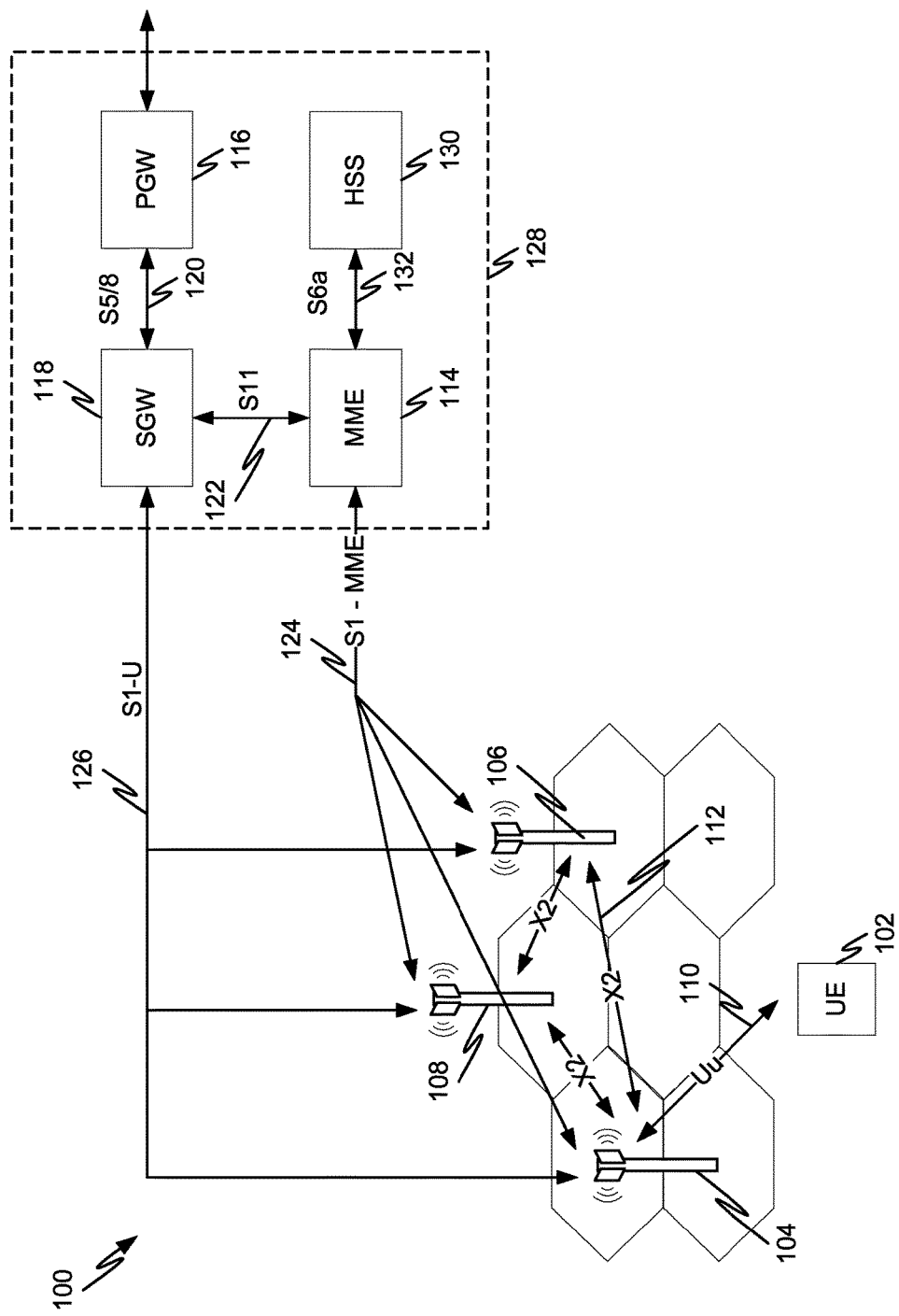
FIG. 1 illustrates an example wireless network with eNBs connected to core network elements.

FIG. 1 illustrates an example wireless network 100 with eNBs connected to core network elements. In this example, the core network (CN) 128, also sometimes referred to as the Evolved Packet Core (EPC), is illustrated as comprising three entities, a Mobility Management Entity (MME) 114, a Serving Gateway (SGW) 118, a Packet Data Network Gateway (PGW) 118, and a Home Subscriber Service (HSS) 130. These entities typically communicate over the illustrated interfaces, with the MME 114 communicating with the SGW 118 over the S11 interface 122 and the SGW 118 communicating with the PGW 116 over the S5/8 interface 120. The MME 114 also communicates with the HSS 130 over the Sha interface 132. The functions of these entities of the CN 128 are well known to those of skill in the art and need not be repeated here. However, a subset of the functions and procedures provided by the CN that will be important to the disclosure include: 1) network access control functions; 2) packet routing and transfer functions; 3) security functions; and 4) User Equipment (UE) reachability procedures. This subset allows one UE to communicate to another UE in a coverage area.

FIG. 1 also illustrates three eNBs 104, 106 and 108. Each eNB 104, 106 and 108 is connected to the CN 128 through its own S1 interface. In the illustrated example, each eNB 104, 106, and 108 is connected to the MME 114 through its own S1-MME interface (illustrated as 124 for simplicity) and to the SGW 118 through its own S1-U interface (illustrated as 126 for simplicity). These interfaces allow the CN 128 entities and eNBs 104, 106, and 108 to provide all the functionality specified for such a wireless network.

eNBs communicate with UEs over a Uu air interface. In FIG. 1, a representative example is where the eNB 104 communicates to the UE 102 over Uu interface 110. eNBs communicate with each other over an X2 interface. In FIG. 1, a representative example is where the eNB 104 communicates to the eNB 106 over X2 interface 112.

Figure 2:
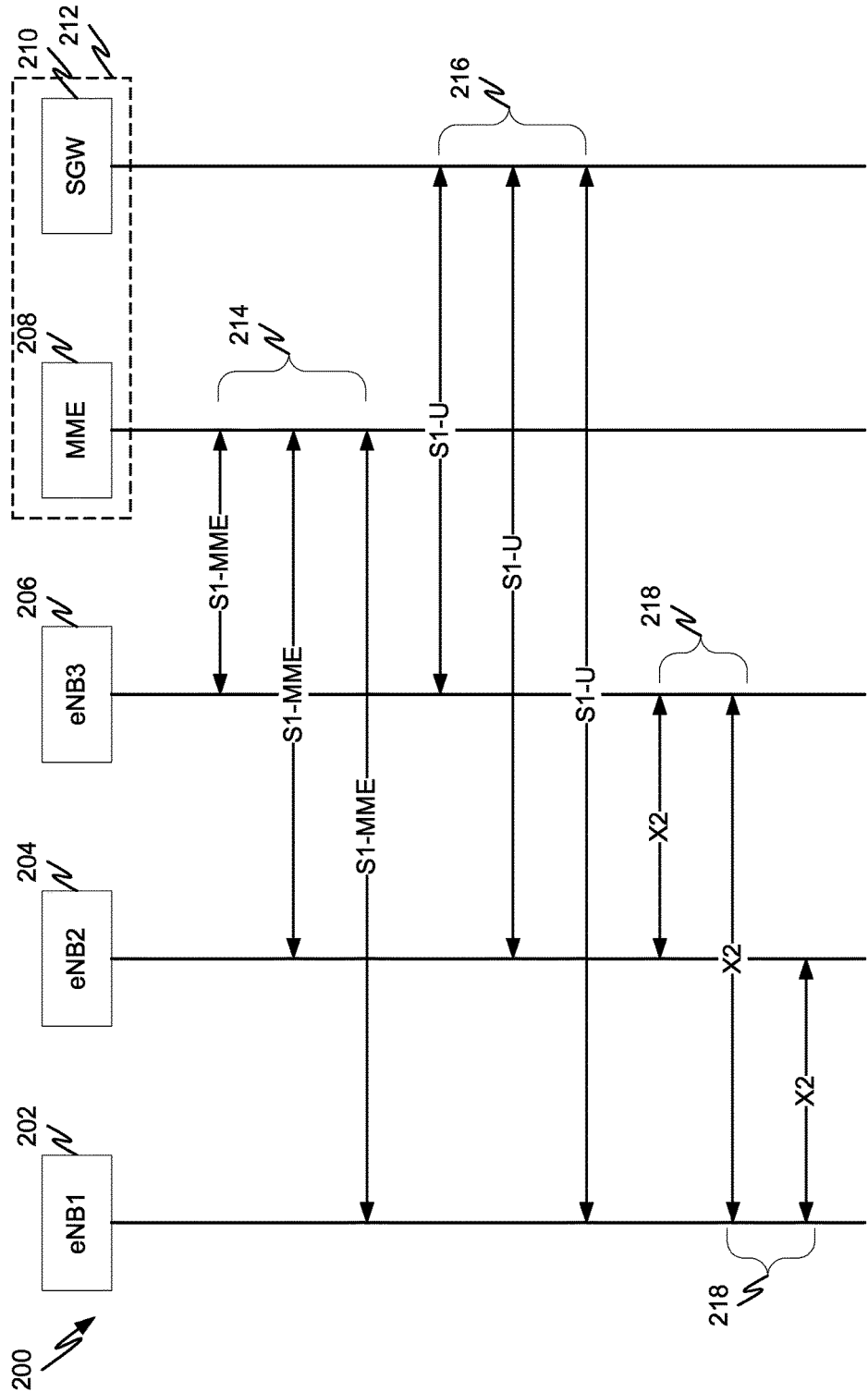
FIG. 2 illustrates an example of the interfaces used to connect eNBs and core network elements.

FIG. 2 illustrates an example of the interfaces used to connect eNBs and core network elements. In this example, shown generally as 200, three eNBs (e.g., eNB1 202, eNB2 204 and eNB3 206) communicate to CN 212 elements through the designated interfaces. The CN 212 has representative entities such as MME 208 and SGW 210. The eNB1 202, the eNB2 204 and the eNB3 206 communicate with the MME 208 over individual S1-MME interfaces 214.

The eNB1 202, the eNB2 204 and the eNB3 206 communicate with the SGW 210 over individual S1-U interfaces 216. The eNB1 202, the eNB2 204 and the eNB3 206 communicate with each other over individual X2 interfaces 218. This represents the normal state of operation for the representative network.

The X2 interfaces 218 between the various eNBs are typically provided using wireless technologies (e.g., microwave or other wireless technologies). The S1 interfaces, however, are typically provided over landline (e.g., fiber optic or other cable) or at least have landline elements.

When a disaster or other event occurs that severs the S1 interfaces (e.g., S1-MME 214 and S1-U 216), and isolates the eNB1 202, the eNB2 204 and the eNB3 206 from the CN 212, the eNB1 202, the eNB2 204 and the eNB3 206 will not be able to provide communications between UE in a traditional network, even though the X2 interfaces 218 remain intact and the eNB1 202, the eNB2 204 and the eNB3 206 otherwise remain functional.

Embodiments of the present disclosure are capable of operating in a resilient mode in the event of such a situation (e.g., the S1 interfaces are disrupted while the X2 interfaces remain intact and/or the eNB remains otherwise functional). In the resilient mode, one or more eNB can operate in an autonomous mode and provide a subset of the CN functionality to allow UE within the coverage area of the resilient mode network. This can be useful in a variety of situations, such as for emergency communications between first responders or other individuals within the resilient mode network (e.g., isolated E-UTRAN) coverage area. Thus even though UE within the coverage area cannot communicate with networks/UE outside the coverage area, the UE in the resilient mode network area will still be able to communicate with each other.

Figure 3:
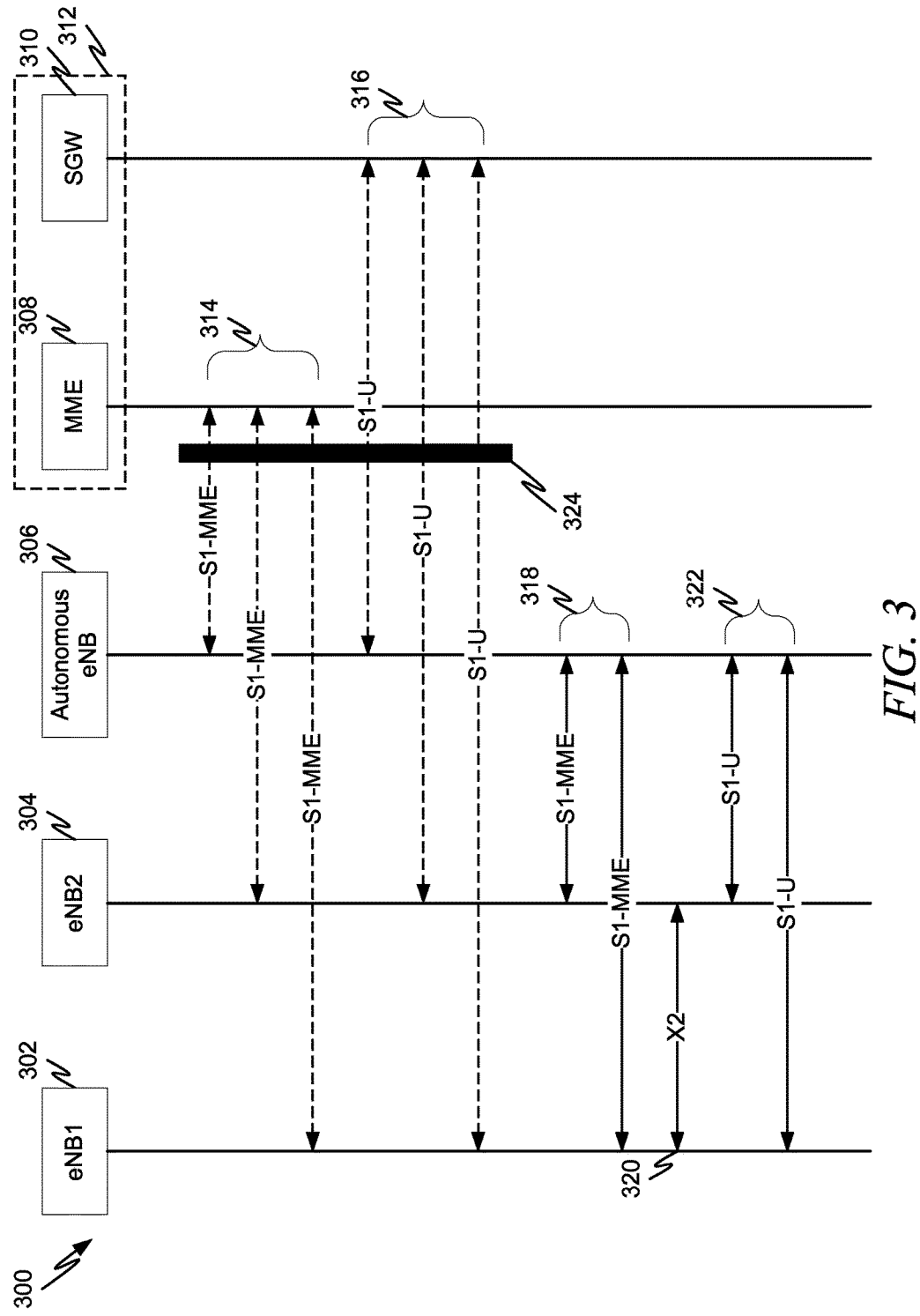
FIG. 3 illustrates an example of a network operating in resilient mode after connections to the core network are severed.

FIG. 3 illustrates an example of a network 300 operating in resilient mode after connections 314/316 to the CN 312 are disrupted. In the example of FIG. 3, the core network 312 is illustrated by the MME 308 and the SGW 310. The three eNBs of FIG. 3, eNB1 302, eNB2 304 and autonomous eNB 306 communicate with the CN 312 entities over S1-MME interfaces 314 and S1-U interfaces 316 during normal operations. The eNB1 302, the eNB2 304 and the autonomous eNB 306 also communicate with each other over X2 interfaces (not shown) during normal operations. During normal operations the autonomous eNB 306 operates just like any other eNB in the network.

The large black bar 324 illustrates disruption of the S1 interfaces 314 and 316. This isolates the eNB1 302, the eNB2 304 and the autonomous eNB 306 from the CN 312. Normal operations of the network thus cannot be provided.

In the example of FIG. 3, however, the autonomous eNB 306 can detect disruption of its S1-MME interface 314 and/or S1-U interface 316. Upon failure of the S1 interfaces 314/316, the autonomous eNB 306 provides a subset of the functionality provided by CN 312 to allow operation of the network in resilient mode. The subset of functions provided include at least one of: 1) network access control functions; 2) packet routing and transfer functions; 3) security functions; or 4) User Equipment (UE) reachability procedures. Providing the subset of functions allows autonomous eNB 306 to replace those functions provided by CN 312 for UE communications within the resilient network coverage area (e.g., the coverage area of the eNBs that form a resilient network). In providing the subset of functions to replace those provided by the CN 312, the autonomous eNB 306 may not provide the exact same functionality in the exact same way for all functions. Some embodiments implement replacement functions to provide functionality sufficient for the resilient mode network, even though it is not identical to the original CN functionality. For example, some embodiments implement security functions differently than those provided by the CN, such as using certificates or other measures that do not rely on a shared secret between the UE and the HSS. As another example, since packets are not routed outside the resilient mode network, packet routing is implemented differently.

The resilient network coverage area can be just the coverage area of an autonomous mode eNB, if no other eNBs are able to connect to it and form a resilient network or can be the coverage area of all eNBs that connect to the autonomous mode eNB to form a resilient network.

In resilient mode, the eNB1 302 and the eNB2 304 establish S1 interfaces with the autonomous mode eNB 306. Thus, in the example of FIG. 3, the eNB1 302 and the eNB2 304 have an S1-MME interface 318 and an S1-U interface 322 with the autonomous eNB 306. The eNB1 302 and the eNB2 304 also retain the X2 interface 320 between themselves. In some embodiments, the autonomous mode eNB 306 uses the S1-MME and/or S1-U interface to communicate with the eNB1 302 and/or eNB2 304 information that would normally be communicated over an X2 interface. In other embodiments, if the autonomous mode eNB 306 has an existing X2 interface with another eNB (e.g., eNB1 302 and/or eNB2 304), it maintains the X2 interface in addition to the newly established S1-MME and/or S1-U interfaces.

Figure 4:
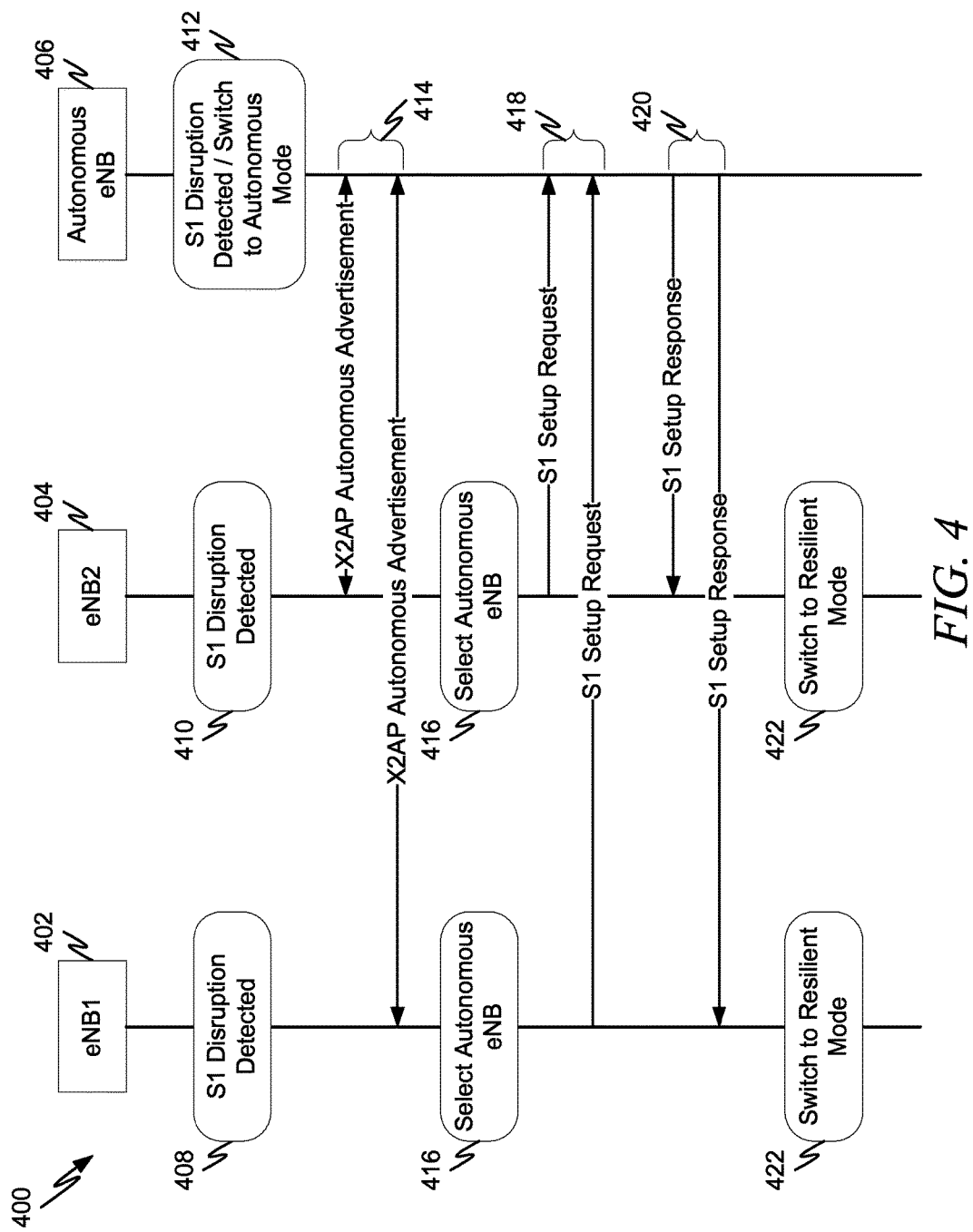
FIG. 4 illustrates an example of a network establishing operation in resilient mode.

FIG. 4 illustrates an example of a network 400 establishing operation in resilient mode. In this example, there are three eNBs, eNB1 402, eNB2 404 and autonomous eNB 406, although there could be either a greater or lesser number of eNBs in other examples. In this example, the eNBs 402, 404 and 406 detect disruption of their S1 interfaces in operations 408, 410 and 412. This isolates the eNBs 402, 404 and 406 from the core network and precludes normal operation.

At this point, one or more of the eNBs that are capable of autonomous operation steps in to provide a subset of CN functions as discussed above. There are various ways in which different embodiments determine which eNB should operate in autonomous mode is discussed below. One option, depicted in FIG. 4 is that eNBs capable of autonomous operation advertise that capability to other eNBs reachable over their X2 interfaces. In the specific example of FIG. 4, autonomous eNB 406 advertises its capability by sending an X2AP Autonomous Capability Advertisement message to eNB1 402 and eNB2 404 over the X2 interfaces with those eNBs.

The X2AP Autonomous Capability Advertisement message comprises information needed by the recipient eNBs to establish an S1 connection with the sending eNB and may also include information needed to select which eNB should be the autonomous eNB when multiple eNBs have autonomous mode capability. In one representative embodiment the X2AP Autonomous Capability Advertisement message comprises the S1 Transport Network Layer (TNL) address and/or a priority value (often referred to herein as a "master priority") that represents the priority of the sending eNB relative to other eNBs to assume the role of the autonomous eNB. The S1 TNL address allows other eNBs to open S1-MME and/or S1-U connections to the associated eNB. Priority is one way to select which eNB should assume the role of the autonomous eNB when multiple eNBs have that capability.

When a priority scheme is used, some embodiments assign the master priority while the S1 links are available.

For example, the priority is assigned using operations and management (OAM). In other embodiments, the master priority is assigned in a random or semi-random fashion so that no two eNBs with autonomous capability are assigned the same priority if they can communicate with each other over X2 interfaces.

When assigning (or computing as described below) master priorities, there is something of a locality component. If there is no (or very small) possibility that two eNBs will end up in the same resilient mode network (one located in the UK and one located in Australia, for example), there is no technical reason they cannot be assigned the same master priority.

In still further embodiments, the master priority is computed by eNBs in a fashion that precludes two eNBs from computing the same priority. In still other embodiments the master priority is computed in a fashion that eNBs will compute the same priority for any particular eNB. In these embodiments, eNBs can compute not only their own master priority, but the master priority of other eNBs as well. In this case, the computation is such that no two eNBs that can communicate over the X2 interfaces compute to the same master priority. When the priority is computed in any embodiment, the priority can be computed after the S1 interface is lost as long as the information needed to compute the priority does not depend on information from the CN.

Computation of priority can be based on any information, such as capacity, eNB hardware/software, one or more characteristics of the eNB (such as a unique address or identifier), number of other eNBs reachable by an eNB, and so forth. Information used to compute priorities only need be known or shared by the eNBs making the priority computations.

Other embodiments for selecting an appropriate autonomous eNB are discussed below.

In the example of FIG. 4, eNB1 402 and eNB2 404 select which eNB they will use as the autonomous eNB in any fashion described herein. This is depicted in operations 416. If autonomous eNB 406 is the only eNB reachable by eNB1 402 and eNB2 404, the selection logic is simple in that they select autonomous eNB 406 as the only reachable autonomous eNB. If the eNB1 402 and the eNB2 404 receive X2AP Autonomous Capability Advertisement messages from multiple eNBs capable of providing autonomous capability, the eNB1 402 and eNB2 404 select the highest relative priority eNB to be the autonomous eNB.

Once the autonomous eNB has been selected, the eNB1 402 and the eNB2 404 then set up S1 interfaces using S1 setup request messages 418 and S1 setup response messages 420. Some embodiments of the present disclosure use the same messages and protocols used to set up S1-MME and S1-U interfaces with the CN. Thus, by the end of the exchanges (e.g., 418 and 420), eNB1 402 and eNB2 404 will have set up S1-MME and S1-U interfaces with autonomous eNB 406. The network then begins operating in resilient mode as indicated by operations 422.

Figure 5:
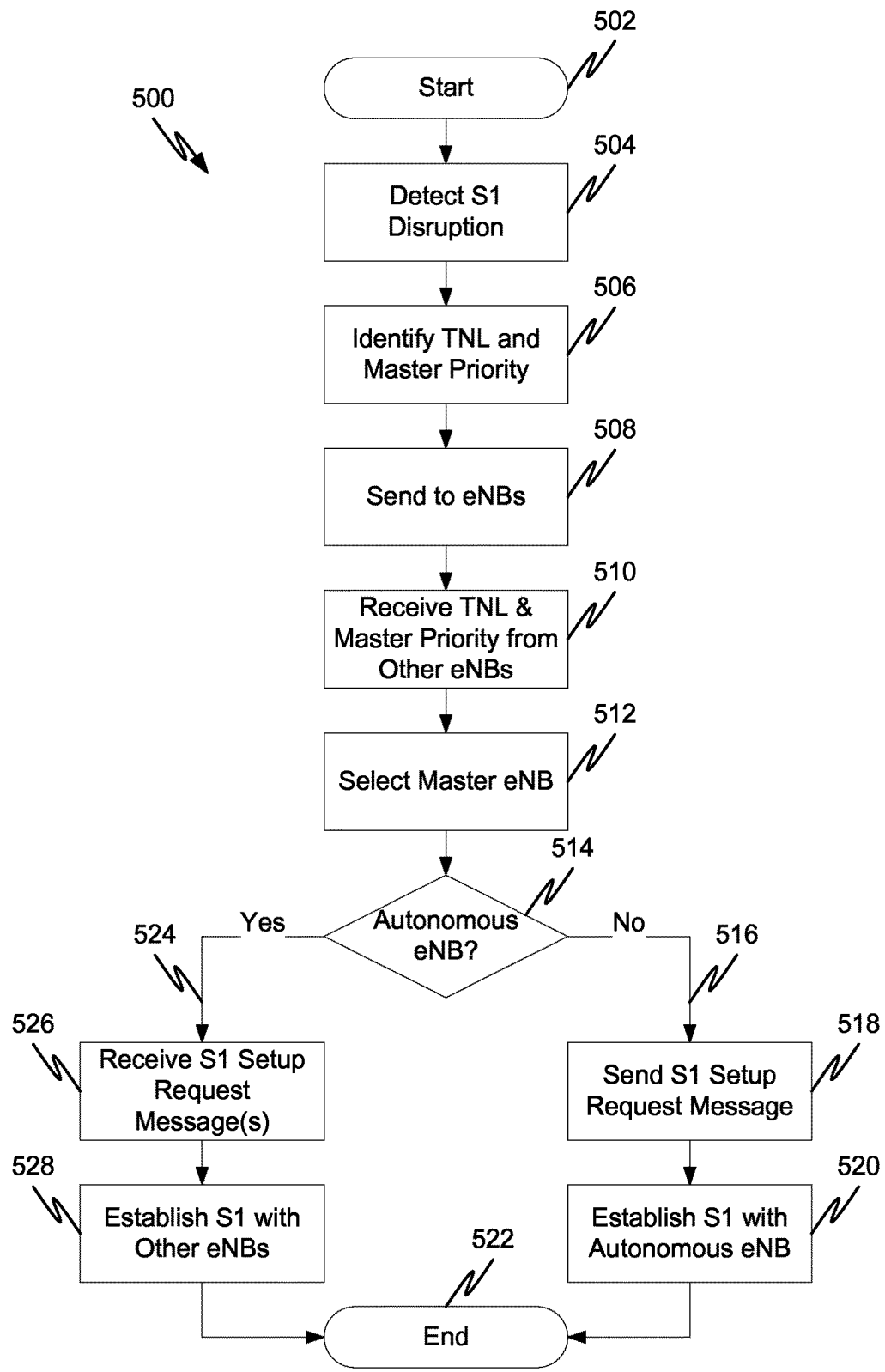
FIG. 5 illustrates an example flow diagram for an eNB establishing operation in resilient mode.

FIG. 5 illustrates an example flow diagram 500 for an autonomous mode eNB establishing operation in resilient mode. This embodiment utilizes a priority scheme to select the autonomous eNB in the resilient network. Thus, even though a particular eNB is capable of operating in autonomous mode, it may not be selected, as depicted in this example flow diagram. The diagram starts in operation 502 and detects disruption of the S1 interface(s) in operation 504. Detecting disruption of the S1 interface is performed in any manner that can detect disruption of the interface. Typical ways to detect disruption of the interface include timeout counters, failure or non-occurrence of expected event(s) (e.g., reception of data, responses, and so forth, combinations thereof, and so forth.

In operation 506, the eNB identifies its TNL address and master priority. In this latter case, the master priority can be assigned or computed, depending on the embodiment, as described above.

In operation 508 the eNB sends its S1 TNL address and master priority to other eNBs over the X2 interface. This is accomplished in some embodiments using an X2AP Autonomous Capability Advertisement message, as previously described. The eNB receives the S1 TNL address and master priorities of other eNBs (possibly in an X2AP Autonomous Capability Advertisement message) as illustrated in operation MO. Note that these two operations can occur in any order since sending of the X2AP Autonomous Capability Advertisement message and receiving the S1 TNL address and master priorities of other eNBs are asynchronous operations.

Once the eNB has its own master priority and the master priorities of other eNBs, it can determine which of the eNBs capable of autonomous operation (including itself) will be selected as the autonomous eNB for the resilient network. This operation is illustrated in 512 where the eNB determines if it or another eNB should be the autonomous eNB for the resilient network.

If it is the autonomous eNB (based on master priority), then the "yes" branch is taken out of operation 514 and the eNB receives S1 setup request messages from the other eNBs in operation 526 and establishes appropriate S1 interfaces (e.g., S1-MME and/or S1-U) with the other eNBs in operation 528 such as through an S1 setup response message. Note that operations 526 and 528 can be repeatedly performed over the course of time as other eNBs make the autonomous eNB selection and send S1 setup request messages.

If the eNB is not the autonomous eNB based on master priority, then the "no" branch is taken out of operation 514 and the eNB sends an S1 setup request message to the selected autonomous eNB in operation 518 and establishes S1 interface(s) with the autonomous eNB in operation 520 such as through reception of an S1 setup response message.

The flow diagram ends at operation 522 as the eNB enters resilient mode operation.

Figure 6:
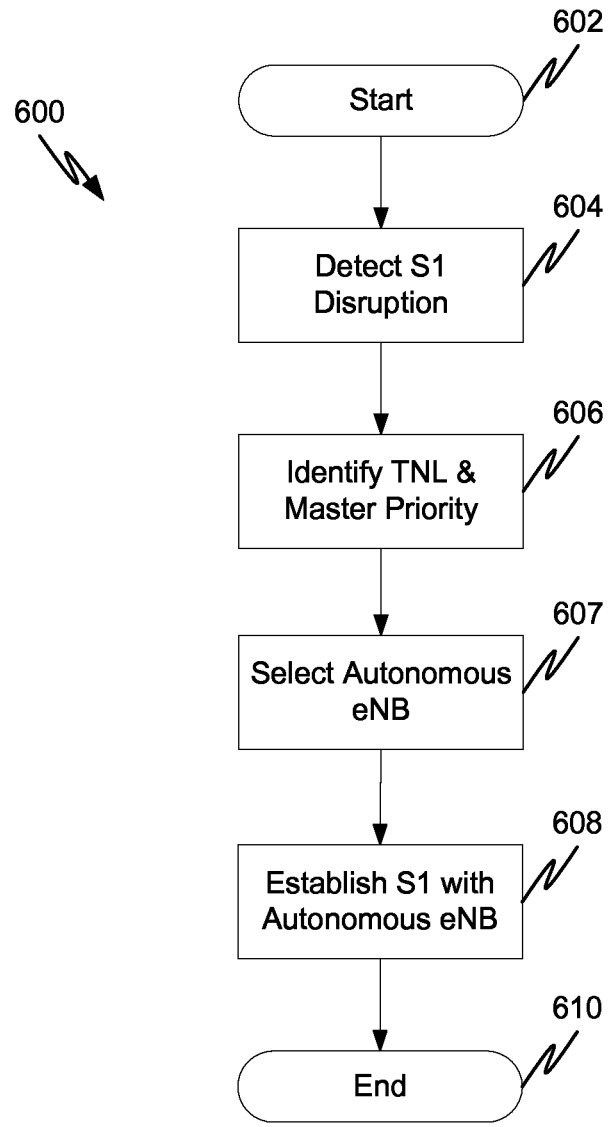
FIG. 6 an example flow diagram for an eNB establishing operation in resilient mode.

FIG. 6 an example flow diagram 600 for an eNB establishing operation in resilient mode according to some embodiments. The diagram is suitable for both eNBs having autonomous mode capability and eNBs not having autonomous mode capability to select an autonomous eNB and to establish S1 interface(s) with the selected autonomous eNB.

The diagram begins as operation 602 and proceeds to operation 604 where the eNB detects disruption of the S1 interface(s) (e.g., S1-MME and/or S1-U). As described, any method that detects disruption of the S1 interface(s) is suitable for embodiments disclosed herein. Typical ways to detect disruption of the interface include timeout counters, failure or non-occurrence of expected event(s) (e.g., reception of data, responses, and so forth), combinations thereof, and so forth.

In operation 606, the eNB identifies the appropriate S1 TNL and/or master priority. In some embodiments, master priorities are not used. In these embodiments, selection of which eNB should be used as the autonomous eNB is pre-configured, so that each eNB knows which eNB(s) are to be autonomous eNBs before disruption of the S1 interface(s) occur. In still other embodiments, autonomous eNBs are selected using methods other than master priorities, such as randomly as explained below. In some embodiments, the TNL and/or master priority are known and/or computed by the eNB so that the master priority does not need to be received by an eNB. For example, when S1 TNL and/or master priorities are pre-assigned, such as discussed above, the eNBs have the S1 TNL and/or master priorities of the various autonomous mode capable eNBs stored or available. In other embodiments master priorities are computed as discussed above. In still other embodiments, the S1 TNL and/or master priorities are received via message from other eNBs, such as in an X2AP Autonomous Capability Advertisement message.

In operation 607, the eNB selects the autonomous mode eNB using a designated method. In some embodiments, the eNB with the highest master priority is selected. In other embodiments, an autonomous mode eNB is pre-selected for the eNB executing the flow diagram of FIG. 6, such as before disruption of the S1 interface(s) occur. In still other embodiments, the eNB establishes contact with all available autonomous mode eNBs. In still further embodiments, alternative autonomous eNBs are randomly selected (from the list of potential autonomous eNB candidates).

In operation 608, the eNB establishes S1 connections with the selected autonomous mode eNB(s), such as using a S1 setup request message. The S1 connection is then established, such as through receiving an S1 setup response message. The method then terminates as shown in operation 610 and the eNB enters resilient mode operation.

Figure 7:
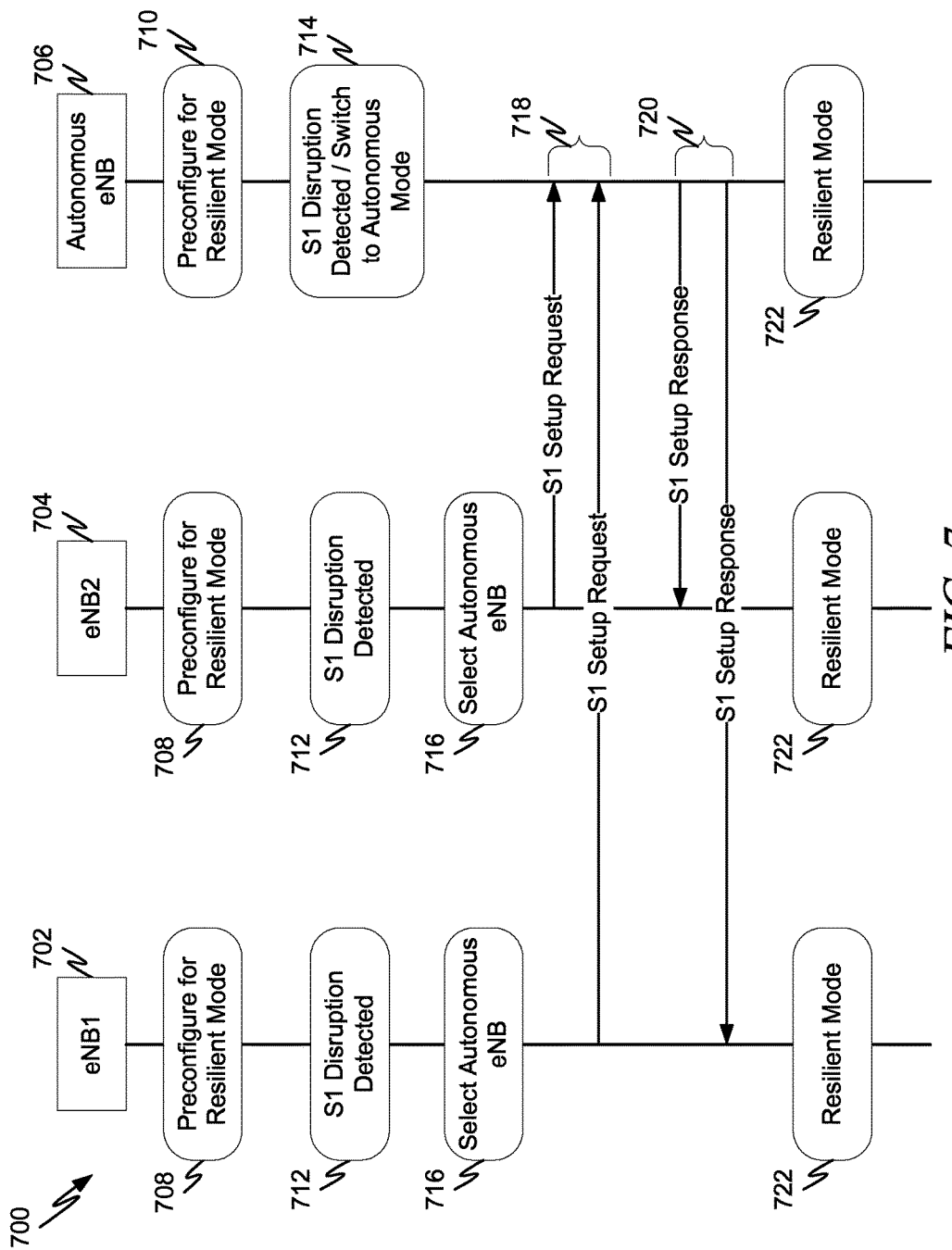
FIG. 7 represents an example of a network establishing operation in resilient mode.

FIG. 7 represents an example of a network 700 establishing operation in resilient mode. The network comprises eNB1 702, eNB2 704 and autonomous mode eNB 706. In operation 708, the eNB1 702 and the eNB2 704 are pre-configured to use the autonomous mode eNB 706 in the event their S1 interface(s) are disrupted. In some embodiments, multiple potential eNBs can be pre-configured as the autonomous mode eNB so that each eNB has a list of candidate autonomous eNBs. Each eNB can then try to establish S1 connection(s) to each of the list, in turn, until an appropriate S1 interface(s) is achieved. Such an approach gives some redundancy since in the event of a disaster or other disruption, not all of the autonomous eNBs may have survived.

In operation 710, the autonomous mode eNB 706 is preconfigured to act as the autonomous mode eNB for the resilient mode network if a disruption of the S1 interfaces occur. As previously explained, all the pre-configurations can be performed using OAM.

In operations 712/714, disruption of the S1 interface(s) is detected by the respective eNBs. This may be performed as previously explained above. When the autonomous mode eNB 706 detects disruption of the S1 interface(s), it switches to autonomous mode so it can provide the subset of CN functions of the resilient mode network. When the eNB1 702 and the eNB2 704 detect S1 interface(s) disruption, they select an autonomous mode eNB. As they have been pre-configured to use the autonomous mode eNB 706, the selection process involves retrieving the appropriate S1 TNL for the autonomous mode eNB 706, along with any other information needed to request that the autonomous mode eNB 706 provide the needed S1 interface(s). As the eNBs have been pre-configured, there is no need for the autonomous mode eNB 706 to provide its S1 TNL and/or master priority to the eNB1 702 and the eNB2 704.

The eNB1 702 and the eNB2 704 next establish appropriate S1 interface(s) (e.g., S1-MME and/or S1-U) with the autonomous mode eNB 706 as depicted in the S1 setup request message 718 and S1 setup response message 720 exchanges as illustrated. The S1 setup request/response messages (e.g., 718 and 720) are the standard S1 setup request/response messages used to establish S1 interface(s) with CN entities (e.g., MME and/or SGW) in some embodiments.

After the S1 interface(s) are established, the network operates in resilient mode as shown by operations 722.

In some embodiments where X2AP Autonomous Capability Advertisement messages are not used to advertise autonomous mode capability (e.g., embodiments discussed above where selection of an autonomous mode eNB is preconfigured, or otherwise not based upon message reception), the autonomous eNB is always ready to provide the subset of CN services, even if it has not detected disruption of the S1 interface(s). Situations can arise where a non-autonomous eNB detects disruption of its S1 interface(s) and attempts to establish S1 interface(s) with one or more autonomous eNBs. Such a situation can arise, for example, if the non-autonomous eNB and the autonomous eNB have different S1 backhaul lines to the CN and these lines may go up and down at different times. Having the autonomous eNB always ready to provide a subset of CN functionality will allow the isolated eNB to function.

In these situations, the subset of CN functionality provided by different embodiments of the autonomous mode eNBs may be different. In other words, because the autonomous mode eNB still has S1 backhaul connections to the CN, some embodiments of the autonomous mode eNB provide additional or different subset(s) of functionality to the isolated (non-autonomous) eNB. Thus, in some embodiments, the autonomous mode eNB establishes S1 interface(s) upon request by the non-autonomous eNB. However, since the autonomous eNB still has S1 connection(s) to the CN, it may still rely on the CN to provide some functionality for the non-autonomous eNB. For example, in these embodiments, the isolated eNB can still have packets routed out of a resilient mode network area to the CN and beyond through the autonomous eNB connection to the CN. Other functions are similarly changed in some embodiments.

Figure 8:
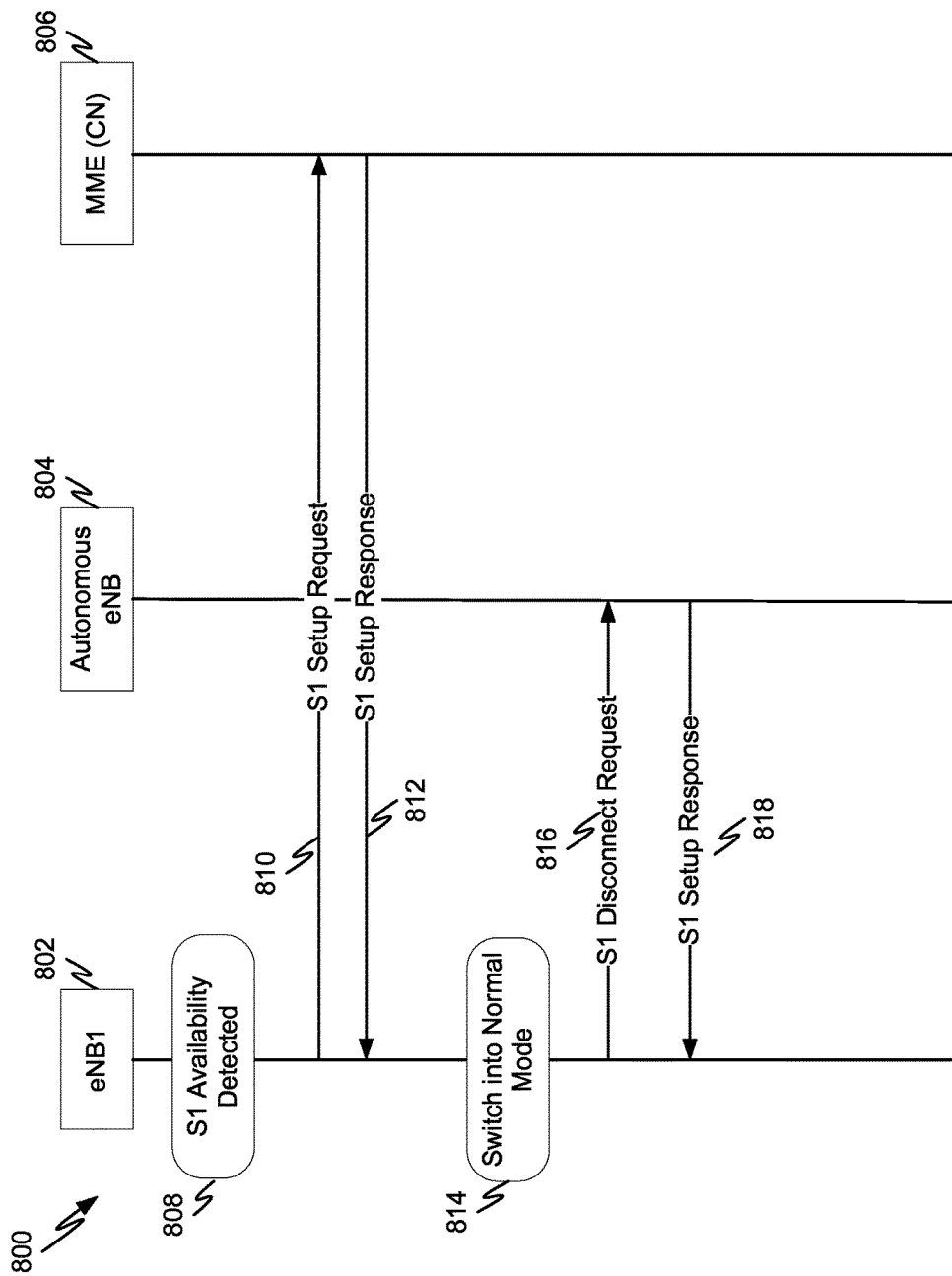
FIG. 8 represents an example of a network reestablishing connection to core network elements and ceasing operating in resilient mode.

FIG. 8 represents an example of a network 800 reestablishing connection to core network elements (e.g., MME 806) and ceasing operating in resilient mode. In this example only MME 806 is illustrated, although an appropriate SGW will operate in a similar fashion.

When an eNB (eNB1 802, for example) detects the availability of the S1 interface (e.g., operation 808), the eNB makes a transition from operating as part of a resilient mode network and return to normal operations. In some embodiments, operation 808, which illustrates detection of an S1 interface availability, is performed in the same fashion as when the eNB initially detects availability of CN elements (e.g., MME 806). In other embodiments, modified procedures may be used.

Once the S1 interface becomes available, the eNB1 802 establishes an appropriate S1 interface(s) with the CN, such as by sending an S1 setup request message 810 and receiving an S1 setup response message 812.

At this point, the eNB1 802 is capable of normal operation, thus the eNB1 802 returns to normal operation and terminates its S1 interface(s) with the autonomous mode eNB 804 as shown in operation 814, S1 disconnect request message 816 and S1 disconnect response message 818. The S1 disconnect request message 816 and S1 disconnect response message 818 may be new messages introduced for that purpose or may use existing messages that have been modified for that purpose in some embodiments. The operation 814 and exchange of messages (816, 818) can be performed in any order.

Figure 9:
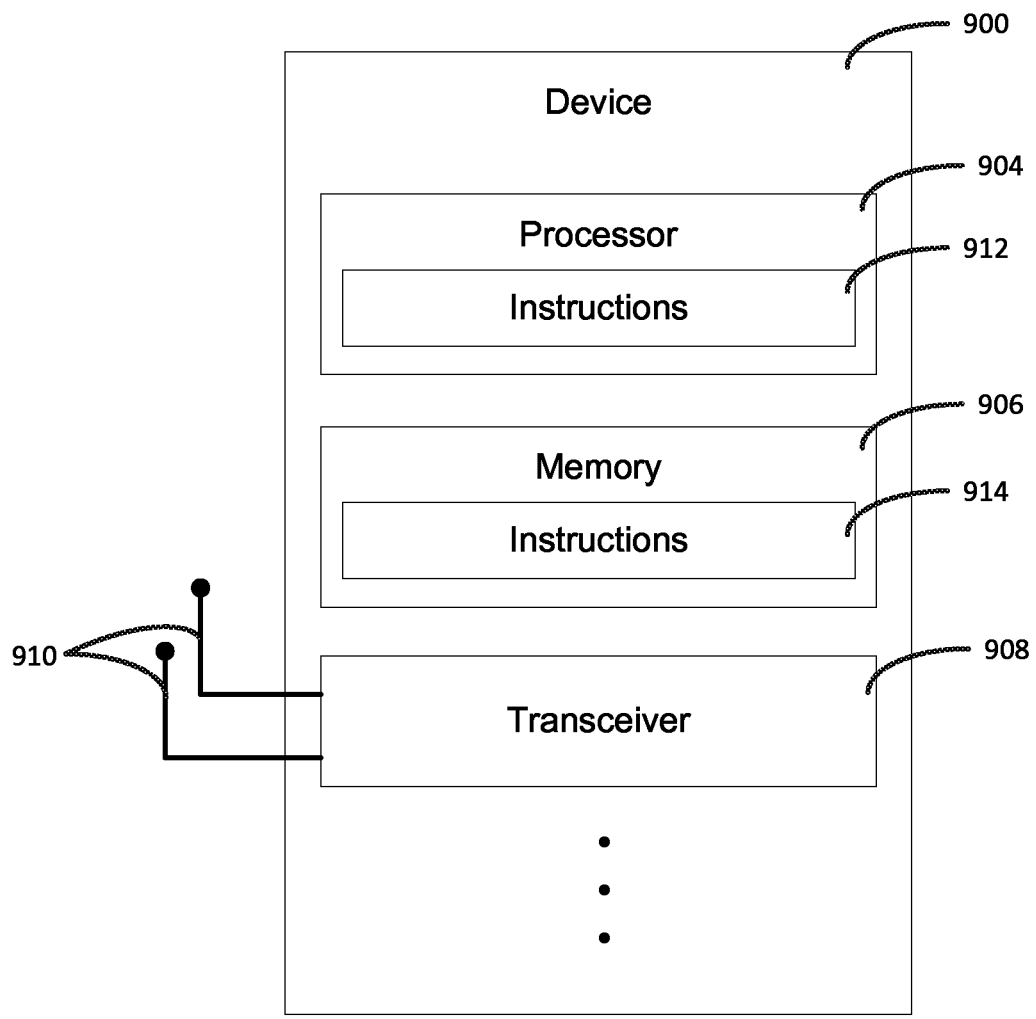
FIG. 9 illustrates a system block diagram of an example system according to some embodiments.

FIG. 9 illustrates a system block diagram of an example system according to some embodiments. FIG. 9 illustrates a block diagram of a device 900. Such a device could be, for example, an eNB such as any of the eNBs or autonomous eNBs described in FIGS. 1-8. Such a device could also be, for example, UE such as UE 102. Finally, such a device could also be the core network entities (MME, PGW, SGW). Not all the described features (such as antennas) will be in all the different devices. For example, if the MME, and SGW and PGW have no need of wireless communications, they may not have antennas and transceiver circuitry for wireless networks. However, if they utilize landline or other wired connections, they may have transceiver circuitry for landline/wired connections.

Device 900 may include processor 904, memory 906, transceiver 908, antennas 910, instructions 912, 914, and possibly other components (not shown).

Processor 904 comprises one or more central processing units (CPUs), graphics processing units (GPUs), accelerated processing units (APUs), or various combinations thereof. The processor 904 provides processing and control functionalities for device 900.

Memory 908 comprises one or more transient and/or static memory units configured to store instructions and data for device 900. Transceiver 908 comprises one or more transceivers including, for an appropriate station or responder, a multiple-input and multiple-output (MIMO) antenna to support MIMO communications. For device 900, transceiver 912 receives transmissions and transmits transmissions. Transceiver 912 may be coupled to antennas 910, which represent an antenna or multiple antennas, as appropriate to the device.

The instructions 912, 914 comprise one or more sets of instructions or software executed on a computing device (or machine) to cause such computing device (or machine) to perform any of the methodologies discussed herein, such as the operations described in conjunction with the eNBs and autonomous eNBs, the flow diagrams above, and so forth. The instructions 912, 914 (also referred to as computer- or machine-executable instructions) may reside, completely or at least partially, within processor 904 and/or the memory 906 during execution thereof by device 900. While instructions 912 and 914 are illustrated as separate, they can be part of the same whole. The processor 904 and memory 906 also comprise machine-readable storage media. The various combinations of processor, memory, instructions, transceiver circuitry and so forth are representative examples of hardware processing circuitry.

In FIG. 9, processing and control functionalities are illustrated as being provided by processor 904 along with associated instructions 912 and 914. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by, for example, cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The term "computer readable medium," "machine-readable medium" and the like should be taken to include a single medium or multiple media (e.g., a centralized or distributed database, and/or associated caches and servers) that store the one or more sets of instructions. The terms shall also be taken to include any medium that is capable of storing, encoding or carrying a set of instructions for execution by the machine and that cause the machine to perform any one or more of the methodologies of the present disclosure. The term "computer readable medium," "machine-readable medium" shall accordingly be taken to include both "computer storage medium," "machine storage medium" and the like (tangible sources including, solid-state memories, optical and magnetic media, or other tangible devices and carriers but excluding signals per se, carrier waves and other intangible sources) and "computer communication medium," "machine communication medium" and the like (intangible sources including, signals per se, carrier wave signals and the like).

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The following represent various example embodiments.

1. An Enhanced NodeB (eNB) comprising hardware processing circuitry configured to:
   detect disruption of a first S1 interface to a Core Network (CN);
   send a first message advertising the eNB is an autonomous eNB and implements a subset of capabilities provided by the CN;
   establish a second S1 interface with a second eNB; and
   provide the subset of capabilities to the second eNB.

2. The eNB of example 1, wherein the subset of capabilities comprises at least one of:
network access control functions;
packet routing and transfer functions;
security functions; or
user equipment (UE) reachability procedures.
3. The eNB of examples 1 or 2, wherein the first message comprises at least one of:
a S1 transport network layer (TNL) address; or
master priority that identifies the priority of the eNB assuming the role of an autonomous eNB.
4. The eNB of example 3, wherein the master priority is pre-assigned before the S1 interface is disrupted.
5. The eNB of example 3, wherein the master priority is computed after the S1 interface is disrupted.
6. The eNB of example 1 or 2, wherein the hardware processing circuitry is further configured to:
receive a second message from a third eNB, the second message comprising at least one of:
a S1 TNL of the third eNB; or
a master priority of the third eNB that identifies the priority of the third eNB assuming the role of an autonomous eNB.
7. The eNB of example 1 or 2, wherein the hardware processing circuitry is further configured to:
detect the return of the first S1 interface;
send an S1 setup request message to the CN;
receive an S1 setup response message from the CN; and
cease providing the subset of capabilities to the second eNB.
8. The eNB of example 1 or 2, wherein the hardware processing circuitry is further configured to:
detect the return of the first S1 interface;
receive an S1 disconnect message from the second eNB;
terminate the second S1 interface with the second eNB;
send an S1 setup request message to the CN; and
receive an S1 setup response message from the CN.
9. An Enhanced NodeB (eNB) comprising hardware processing circuitry configured to:
detect disruption of a first S1 interface to a Core Network (CN);
send a first message advertising the eNB is an autonomous eNB and implements a subset of capabilities provided by the CN;
receive a second message advertising a second eNB is an autonomous eNB and implements a subset of capabilities provided by the CN; and
based on the contents of the first message and the contents of the second message evaluate whether the eNB should assume the role of the autonomous eNB or whether the second eNB should assume the role of the autonomous eNB.
10. The eNB of example 9, wherein responsive to the eNB assuming the role of the autonomous eNB, the processing circuitry is further configured to:
establish a second S1 interface with the second eNB; and
provide the subset of capabilities to the second eNB.
11. The eNB of example 9, wherein responsive to the eNB not assuming the role of the autonomous eNB, the processing circuitry is further configured to send a third message to the second eNB, the third message comprising a request to establish a second S1 interface with the second eNB.
12. The eNB of examples 9, 10 or 11 wherein the first message comprises at least one of:
a S1 transport network layer (TNL) address of the eNB; or
master priority that identifies the priority of the eNB assuming the role of an autonomous eNB.
13. The eNB of examples 9, 10 or 11 wherein the second message comprises at least one of:
a S1 transport network layer (TNL) address of the second eNB; or
master priority that identifies the priority of the second eNB assuming the role of an autonomous eNB.
14. The eNB of example 12, wherein the master priority is pre-assigned before the S1 interface is disrupted.
15. The eNB of example 13, wherein the master priority is pre-assigned before the S1 interface is disrupted.
16. The eNB of example 12, wherein the master priority is computed after the S1 interface is disrupted.
17. The eNB of example 13, wherein the master priority is computed after the S1 interface is disrupted.
18. The eNB of example 9, wherein the hardware processing circuitry is further configured to:
receive a third message from a third eNB, the third message comprising at least one of:
a S1 TNL of the third eNB; or
a master priority of the third eNB that identifies the priority of the third eNB assuming the role of an autonomous eNB; and
based on the contents of the first message, the contents of the second message, and the contents of the third message evaluate whether the eNB should assume the role of the autonomous eNB.
19. The eNB of example 9, 10, 11 or 18, wherein the subset of capabilities comprises at least one of:
network access control functions;
packet routing and transfer functions;
security functions; or
user equipment (UE) reachability procedures.
20. An Enhanced NodeB (eNB) comprising hardware processing circuitry configured to:
detect disruption of a first S1 interface to a Core Network (CN);
evaluate whether the eNB should assume the role of an autonomous eNB;
responsive to assuming the role of the autonomous eNB, configuring the processing circuitry to:
establish a second S1 interface with at least one other eNB; and
provide a subset of functions provided by the CN to the at least one other eNB; and
responsive to not assuming the role of the autonomous eNB, configuring the processing circuitry to:
establish a second S1 interface with an eNB that has assumed the role of the autonomous eNB; and
rely on the autonomous eNB to provide the subset of functions.
21. The eNB of example 20, wherein the processing circuitry is configured to evaluate whether the eNB should assume the role of an autonomous eNB by being configured to:
compare a master priority of the eNB to master priorities of at least one other eNB and selecting as the autonomous eNB the eNB with the highest associated master priority.
22. The eNB of example 20 or 21, wherein the subset of functions comprises at least one of:
network access control functions;
packet routing and transfer functions;
security functions; or
user equipment (UE) reachability procedures.

23. The eNB of examples 21, wherein the master priorities of the at least one other eNB are computed by the eNB.
24. The eNB of example 21, wherein the master priorities of the at least one other eNB are pre-assigned before the S1 interface is disrupted.
25. The eNB of example 23, wherein the master priorities of the at least one other eNB are computed after the S1 interface is disrupted.
26. An Enhanced NodeB (eNB) comprising hardware processing circuitry configured to:
detect disruption of a first S1 interface to a Core Network (CN);
select an eNB to be an autonomous eNB;
establish a second S1 interface with the autonomous eNB; and
rely on the autonomous eNB to provide a subset of functions provided by the CN.
27. The eNB of example 26, wherein the processing circuitry is configured to select the eNB to be the autonomous eNB by being configured to:
retrieve the identify of which eNB should be used as the autonomous eNB; and
send an S1 setup request message to the autonomous eNB.
28. The eNB of example 26, wherein the hardware processing circuitry is further configured to receive an S1 setup response message from the autonomous eNB.
29. The eNB of example 26, wherein the processing circuitry is configured to select the eNB to be the autonomous eNB by being configured to:
receive a first message from an second eNB, the first message comprising a master priority associated with the second eNB; and
send an S1 setup request message to the second eNB in order to use the second eNB as the autonomous eNB.
30. The eNB of example 29, wherein the processing circuitry is configured to select the eNB to be the autonomous eNB by being configured to:
receive a second message from an third eNB, the second message comprising a master priority associated with the third eNB;
select from among the second eNB and the third eNB whichever eNB has the highest associated master priority as the autonomous eNB; and
send an S1 setup request message to the selected autonomous eNB.
31. The eNB of example 26, 27, 28, 29, or 30 wherein the hardware processing circuitry is further configured to:
detect availability the first S1 interface to the CN;
send a S1 setup request message to the CN; and
send a S1 disconnect request message to the autonomous eNB.
32. A method performed by an Enhanced NodeB (eNB) comprising:
detecting disruption of a first S1 interface to a Core Network (CN);
sending a first message advertising the eNB is an autonomous eNB and implements a subset of capabilities provided by the CN;
establishing a second S1 interface with a second eNB; and
providing the subset of capabilities to the second eNB.
33. The method of example 32, wherein the subset of capabilities comprises at least one of:
network access control functions;
packet routing and transfer functions;
security functions; or
user equipment (UE) reachability procedures.
34. The method of examples 32 or 33, wherein the first message comprises at least one of:
a S1 transport network layer (TNL) address; or
master priority that identifies the priority of the eNB assuming the role of an autonomous eNB.
35. The method of example 34, wherein the master priority is pre-assigned before the S1 interface is disrupted.
36. The method of example 34, wherein the master priority is computed after the S1 interface is disrupted.
37. The method of example 32 or 33, further comprising:
receiving a second message from a third eNB, the second message comprising at least one of:
a S1 TNL of the third eNB; or
a master priority of the third eNB that identifies the priority of the third eNB assuming the role of an autonomous eNB.
38. The method of example 32 or 33, further comprising:
detecting the return of the first S1 interface;
sending an S1 setup request message to the CN;
receiving an S1 setup response message from the CN; and
ceasing providing the subset of capabilities to the second eNB.
39. The method of example 32 or 33, further comprising:
detecting the return of the first S1 interface;
receiving an S1 disconnect message from the second eNB;
terminating the second S1 interface with the second eNB;
sending an S1 setup request message to the CN; and
receiving an S1 setup response message from the CN.
40. A method performed by an Enhanced NodeB (eNB) comprising:
detecting disruption of a first S1 interface to a Core Network (CN);
sending a first message advertising the eNB is an autonomous eNB and implements a subset of capabilities provided by the CN;
receiving a second message advertising a second eNB is an autonomous eNB and implements a subset of capabilities provided by the CN; and
based on the contents of the first message and the contents of the second message evaluating whether the eNB should assume the role of the autonomous eNB or whether the second eNB should assume the role of the autonomous eNB.
41. The method of example 40, wherein responsive to the eNB assuming the role of the autonomous eNB, the method further comprises:
establishing a second S1 interface with the second eNB; and
providing the subset of capabilities to the second eNB.
42. The method of example 40, wherein responsive to the eNB not assuming the role of the autonomous eNB, the method further comprises sending a third message to the second eNB, the third message comprising a request to establish a second S1 interface with the second eNB.
43. The method of examples 40, 41 or 42 wherein the first message comprises at least one of:
a S1 transport network layer (TNL) address of the eNB; or
master priority that identifies the priority of the eNB assuming the role of an autonomous eNB.
44. The method of examples 40, 41 or 42 wherein the second message comprises at least one of:
a S1 transport network layer (TNL) address of the second eNB; or master priority that identifies the priority of the second eNB assuming the role of an autonomous eNB.

45. The method of example 43, wherein the master priority is pre-assigned before the S1 interface is disrupted.

46. The method of example 44, wherein the master priority is pre-assigned before the S1 interface is disrupted.

47. The method of example 43, wherein the master priority is computed after the S1 interface is disrupted.

48. The method of example 44, wherein the master priority is computed after the S1 interface is disrupted.

49. The method of example 40, further comprising:
receiving a third message from a third eNB, the third message comprising at least one of:
a S1 TNL of the third eNB; or
a master priority of the third eNB that identifies the priority of the third eNB assuming the role of an autonomous eNB; and
based on the contents of the first message, the contents of the second message, and the contents of the third message evaluating whether the eNB should assume the role of the autonomous eNB.

50. The computer storage medium of example 40, 41, 42 or 49, wherein the subset of capabilities comprises at least one of:
network access control functions;
packet routing and transfer functions;
security functions; or
user equipment (UE) reachability procedures.

51. A method performed by an Enhanced NodeB (eNB) comprising:
detecting disruption of a first S1 interface to a Core Network (CN);
evaluating whether the eNB should assume the role of an autonomous eNB;
responsive to assuming the role of the autonomous eNB:
establishing a second S1 interface with at least one other eNB; and
providing a subset of functions provided by the CN to the at least one other eNB; and
responsive to not assuming the role of the autonomous eNB:
establishing a second S1 interface with an eNB that has assumed the role of the autonomous eNB; and
relying on the autonomous eNB to provide the subset of functions.

52. The method of example 51, wherein method evaluates whether the eNB should assume the role of an autonomous eNB by performing operations comprising:
comparing a master priority of the eNB to master priorities of at least one other eNB and selecting as the autonomous eNB the eNB with the highest associated master priority.

53. The method of example 51 or 52, wherein the subset of functions comprises at least one of:
network access control functions;
packet routing and transfer functions;
security functions; or
user equipment (UE) reachability procedures.

54. The method of example 52, wherein the master priorities of the at least one other eNB are computed by the eNB.

55. The method of example 52, wherein the master priorities of the at least one other eNB are pre-assigned before the S1 interface is disrupted.

56. The method of example 54, wherein the master priorities of the at least one other eNB are computed after the S1 interface is disrupted.

57. A method performed by an Enhanced NodeB (eNB) comprising:
detecting disruption of a first S1 interface to a Core Network (CN);
selecting an eNB to be an autonomous eNB;
establishing a second S1 interface with the autonomous eNB; and
relying on the autonomous eNB to provide a subset of functions provided by the CN.

58. The method of example 57, wherein selecting the eNB to be the autonomous eNB is performed by executing operations comprising:
retrieving the identify of which eNB should be used as the autonomous eNB; and
sending an S1 setup request message to the autonomous eNB.

59. The method of example 57, further comprising receiving an S1 setup response message from the autonomous eNB.

60. The method of example 57, wherein selecting the eNB to be the autonomous eNB is performed by executing operations comprising:
receiving a first message from an second eNB, the first message comprising a master priority associated with the second eNB; and
sending an S1 setup request message to the second eNB in order to use the second eNB as the autonomous eNB.

61. The method of example 60, wherein selecting the eNB to be the autonomous eNB is performed by executing operations comprising:
receiving a second message from an third eNB, the second message comprising a master priority associated with the third eNB;
selecting from among the second eNB and the third eNB whichever eNB has the highest associated master priority as the autonomous eNB; and
sending an S1 setup request message to the selected autonomous eNB.

62. The method of example 57, 58, 59, 60, or 61 further comprising:
detecting availability the first S1 interface to the CN;
sending a S1 setup request message to the CN; and
sending a S1 disconnect request message to the autonomous eNB.

63. A computer storage medium comprising computer executable instructions that when executed configure a device to:
detect disruption of a first S1 interface to a Core Network (CN);
send a first message advertising the eNB is an autonomous eNB and implements a subset of capabilities provided by the CN;
establish a second S1 interface with a second eNB; and
provide the subset of capabilities to the second eNB.

64. The computer storage medium of example 63, wherein the subset of capabilities comprises at least one of:
network access control functions;
packet routing and transfer functions;
security functions; or
user equipment (UE) reachability procedures.

65. The computer storage medium of examples 63 or 64, wherein the first message comprises at least one of:
a S1 transport network layer (TNL) address; or
master priority that identifies the priority of the eNB assuming the role of an autonomous eNB.

66. The computer storage medium of example 65, wherein the master priority is pre-assigned before the S1 interface is disrupted.

67. The computer storage medium of example 65, wherein the master priority is computed after the S1 interface is disrupted.

68. The computer storage medium of example 63 or 64, wherein the executable instructions further configure the device to:
receive a second message from a third eNB, the second message comprising at least one of:
a S1 TNL of the third eNB; or
a master priority of the third eNB that identifies the priority of the third eNB assuming the role of an autonomous eNB.

69. The computer storage medium of example 63 or 64, wherein the executable instructions further configure the device to:
detect the return of the first S1 interface;
send an S1 setup request message to the CN;
receive an S1 setup response message from the CN; and
cease providing the subset of capabilities to the second eNB.

70. The computer storage medium of example 63 or 64, wherein the executable instructions further configure the device to:
detect the return of the first S1 interface;
receive an S1 disconnect message from the second eNB;
terminate the second S1 interface with the second eNB;
send an S1 setup request message to the CN; and
receive an S1 setup response message from the CN.

71. A computer storage medium comprising computer executable instructions that when executed configure a device to:
detect disruption of a first S1 interface to a Core Network (CN);
send a first message advertising the eNB is an autonomous eNB and implements a subset of capabilities provided by the CN;
receive a second message advertising a second eNB is an autonomous eNB and implements a subset of capabilities provided by the CN; and
based on the contents of the first message and the contents of the second message evaluate whether the eNB should assume the role of the autonomous eNB or whether the second eNB should assume the role of the autonomous eNB.

72. The computer storage medium of example 71, wherein responsive to the eNB assuming the role of the autonomous eNB, the executable instructions further configure the device to:
establish a second S1 interface with the second eNB; and
provide the subset of capabilities to the second eNB.

73. The computer storage medium of example 71, wherein responsive to the eNB not assuming the role of the autonomous eNB, the executable instructions further configure the device to send a third message to the second eNB, the third message comprising a request to establish a second S1 interface with the second eNB.

74. The eNB of examples 71, 72 or 73 wherein the first message comprises at least one of:
a S1 transport network layer (TNL) address of the eNB; or
master priority that identifies the priority of the eNB assuming the role of an autonomous eNB.

75. The eNB of examples 71, 72 or 73 wherein the second message comprises at least one of:
a S1 transport network layer (TNL) address of the second eNB; or
master priority that identifies the priority of the second eNB assuming the role of an autonomous eNB.

76. The computer storage medium of example 74, wherein the master priority is pre-assigned before the S1 interface is disrupted.

77. The computer storage medium of example 75, wherein the master priority is pre-assigned before the S1 interface is disrupted.

78. The computer storage medium of example 74, wherein the master priority is computed after the S1 interface is disrupted.

79. The computer storage medium of example 75, wherein the master priority is computed after the S1 interface is disrupted.

80. The computer storage medium of example 71, wherein the executable instructions further configure the device to:
receive a third message from a third eNB, the third message comprising at least one of:
a S1 TNL of the third eNB; or
a master priority of the third eNB that identifies the priority of the third eNB assuming the role of an autonomous eNB; and
based on the contents of the first message, the contents of the second message, and the contents of the third message evaluate whether the eNB should assume the role of the autonomous eNB.

81. The computer storage medium of example 71, 72, 73 or 80, wherein the subset of capabilities comprises at least one of:
network access control functions;
packet routing and transfer functions;
security functions; or
user equipment (UE) reachability procedures.

82. A computer storage medium comprising computer executable instructions that when executed configure a device to:
detect disruption of a first S1 interface to a Core Network (CN);
evaluate whether the eNB should assume the role of an autonomous eNB;
responsive to assuming the role of the autonomous eNB, configuring the processing circuitry to:
establish a second S1 interface with at least one other eNB; and
provide a subset of functions provided by the CN to the at least one other eNB; and
responsive to not assuming the role of the autonomous eNB, configuring the processing circuitry to:
establish a second S1 interface with an eNB that has assumed the role of the autonomous eNB; and
rely on the autonomous eNB to provide the subset of functions.

83. The computer storage medium of example 82, wherein the processing circuitry is configured to evaluate whether the eNB should assume the role of an autonomous eNB by being configured to:

compare a master priority of the eNB to master priorities of at least one other eNB and selecting as the autonomous eNB the eNB with the highest associated master priority.

84. The computer storage medium of example 82 or 83, wherein the subset of functions comprises at least one of:
network access control functions;
packet routing and transfer functions;
security functions; or
user equipment (UE) reachability procedures.

85. The eNB of examples 83, wherein the master priorities of the at least one other eNB are computed by the eNB.

86. The computer storage medium of example 83, wherein the master priorities of the at least one other eNB are pre-assigned before the S1 interface is disrupted.

87. The computer storage medium of example 85, wherein the master priorities of the at least one other eNB are computed after the S1 interface is disrupted.

88. A computer storage medium comprising computer executable instructions that when executed configure a device to:
detect disruption of a first S1 interface to a Core Network (CN);
select an eNB to be an autonomous eNB;
establish a second S1 interface with the autonomous eNB; and
rely on the autonomous eNB to provide a subset of functions provided by the CN.

89. The computer storage medium of example 88, wherein the processing circuitry is configured to select the eNB to be the autonomous eNB by being configured to:
retrieve the identity of which eNB should be used as the autonomous eNB; and
send an S1 setup request message to the autonomous eNB.

90. The computer storage medium of example 88, wherein the executable instructions further configure the device to receive an S1 setup response message from the autonomous eNB.

91. The computer storage medium of example 88, wherein the processing circuitry is configured to select the eNB to be the autonomous eNB by being configured to:
receive a first message from an second eNB, the first message comprising a master priority associated with the second eNB; and
send an S1 setup request message to the second eNB in order to use the second eNB as the autonomous eNB.

92. The computer storage medium of example 91, wherein the processing circuitry is configured to select the eNB to be the autonomous eNB by being configured to:
receive a second message from an third eNB, the second message comprising a master priority associated with the third eNB;
select from among the second eNB and the third eNB whichever eNB has the highest associated master priority as the autonomous eNB; and
send an S1 setup request message to the selected autonomous eNB.

93. The computer storage medium of example 88, 89, 90, 91, or 92, wherein the executable instructions further configure the device to:
detect availability the first S1 interface to the CN;
send a S1 setup request message to the CN; and
send a S1 disconnect request message to the autonomous eNB.

94. A device comprising:
at least one antenna;
transceiver circuitry coupled to the at least one antenna;
memory;
a processor coupled to the memory and transceiver circuitry; and
instructions, stored in the memory, which when executed cause the processor to:
detect disruption of a first S1 interface to a Core Network (CN);
send a first message advertising the eNB is an autonomous eNB and implements a subset of capabilities provided by the CN;
establish a second S1 interface with a second eNB; and
provide the subset of capabilities to the second eNB.

95. The device of example 94, wherein when the instructions are executed they further cause the processor to:
detect availability of a third S1 interface with the CN;
establish the third S1 interface with the CN; and
terminate the second S1 interface with the second eNB.

What is claimed is:

1. An Enhanced NodeB (eNB) comprising: memory; and hardware processing circuitry, configured to:
detect disruption of a first S1 interface to a Core Network (CN);
evaluate whether the eNB should assume a role of an autonomous eNB;
responsive to assuming the role of the autonomous eNB, configuring the processing circuitry to:
establish a second S1 interface with at least one other eNB; and
provide a subset of functions provided by the CN to the at least one other eNB; and
responsive to not assuming the role of the autonomous eNB, configuring the processing circuitry to:
establish a second S1 interface with an eNB that has assumed the role of the autonomous eNB; and
rely on the autonomous eNB to provide the subset of functions;
wherein:
the processing circuitry is further configured to:
evaluate whether the eNB should assume the role of the autonomous eNB by being configured to compare a master priority of the eNB to master priorities of the at least one other eNB; and
select as the autonomous eNB the eNB with a highest associated master priority;
the master priorities of the at least one other eNB are computed by the eNB; and
the master priorities of the at least one other eNB are computed after the S1 interface is disrupted.

2. An Enhanced NodeB (eNB) comprising hardware processing circuitry configured to:
detect disruption of a first S1 interface to a Core Network (CN);
evaluate whether the eNB should assume the role of an autonomous eNB;
responsive to assuming the role of the autonomous eNB, configuring the processing circuitry to:
establish a second S1 interface with at least one other eNB; and
provide a subset of functions provided by the CN to the at least one other eNB; and
responsive to not assuming the role of the autonomous eNB, configuring the processing circuitry to:

establish a second S1 interface with an eNB that has assumed the role of the autonomous eNB; and rely on the autonomous eNB to provide the subset of functions;

wherein the processing circuitry is further configured to, during operation:

evaluate whether the eNB should assume the role of the autonomous eNB by being configured to compare a master priority of the eNB to master priorities of the at least one other eNB; and select as the autonomous eNB the eNB with a highest associated master priority.

3. The eNB of claim 1, wherein the subset of functions comprises at least one of:

network access control functions;

packet routing and transfer functions;

security functions; or user equipment (UE) reachability procedures.

4. The eNB of claim 2, wherein the master priorities of the at least one other eNB are computed by the eNB.

5. The eNB of claim 2, wherein the master priorities of the at least one other eNB are pre-assigned before the S1 interface is disrupted.

6. The eNB of claim 4, wherein the master priorities of the at least one other eNB are computed after the S1 interface is disrupted.

7. A method performed by an Enhanced NodeB (eNB) comprising:

detecting disruption of a first S1 interface to a Core Network (CN):

selecting an eNB to be an autonomous eNB;

establishing a second S1 interface with the autonomous eNB; and relying on the autonomous eNB to provide a subset of functions provided by the CN:

wherein selecting the eNB to be the autonomous eNB is performed by executing operations comprising:

receiving a first message from a second eNB, the first message comprising a master priority associated with the second eNB; and sending an S1 setup request message to the second eNB in order to use the second eNB as the autonomous eNB.

8. The method of claim 7, wherein selecting the eNB to be the autonomous eNB is performed by executing operations comprising:

retrieving the identity of which eNB should be used as the autonomous eNB; and sending an S1 setup request message to the autonomous eNB.

9. The method of claim 7, further comprising receiving an S1 setup response message from the autonomous eNB.

10. The method of claim 7, wherein selecting the eNB to be the autonomous eNB is performed by executing operations comprising:

receiving a second message from a third eNB, the second message comprising a master priority associated with the third eNB;

selecting from among the second eNB and the third eNB whichever eNB has the highest associated master priority as the autonomous eNB; and sending an S1 setup request message to the selected autonomous eNB.

11. A method performed by an Enhanced NodeB (eNB) comprising:

detecting disruption of a first S1 interface to a Core Network (CN);

selecting an eNB that is not in communication with the CN to be an autonomous eNB based on the detecting of the disruption;

subsequent to the selecting, establishing a second S1 interface with the autonomous eNB;

relying on the autonomous eNB to provide a subset of functions provided by the CN;

detecting availability the first S1 interface to the CN;

sending a S1 setup request message to the CN; and sending a S1 disconnect request message to the autonomous eNB.

12. A computer storage medium comprising computer executable instructions that when executed configure a device to:

detect disruption of a first S1 interface to a Core Network (CN);

send a first message advertising the eNB is an autonomous eNB and implements a subset of capabilities provided by the CN;

establish a second S1 interface with a second eNB; and provide the subset of capabilities to the second eNB;

wherein:

the first message comprises at least one of:

an S1 transport network layer (TNL) address; or a master priority that identifies the priority of the eNB assuming the role of an autonomous eNB.

13. The computer storage medium of claim 12, wherein the subset of capabilities comprises at least one of:

network access control functions;

packet routing and transfer functions;

security functions;

or user equipment (UE) reachability procedures.

14. The computer storage medium of claim 12, wherein the master priority is pre-assigned before the S1 interface is disrupted.

15. The computer storage medium of claim 12, wherein the master priority is computed after the S1 interface is disrupted.

16. The computer storage medium of claim 12, wherein the executable instructions further configure the device to:

receive a second message from a third eNB, the second message comprising at least one of:

an S1 TNL of the third eNB;

or a master priority of the third eNB that identifies the priority of the third eNB assuming the role of an autonomous eNB.

17. An Enhanced NodeB (eNB) device comprising:

at least one antenna;

transceiver circuitry coupled to the at least one antenna;

memory;

a processor coupled to the memory and transceiver circuitry; and instructions, stored in the memory, which when executed cause the eNB processor to:

detect disruption of a first S1 interface to a Core Network (CN);

select an eNB that is not in communication with the CN to be an autonomous eNB, based on the detected disruption;

subsequent to the select, send a message to the autonomous eNB to establish a second S1 interface with the autonomous eNB;

determine whether the second S1 interface was successfully established; and responsive to determining that the second S1 interface was not successfully established:
select a different autonomous eNB; and
send a second message to the different autonomous eNB to establish the second S1 interface with the different autonomous eNB.

18. The eNB of claim 1, wherein the subset of functions comprises:
network access control functions;
packet routing and transfer functions;
security functions; and
user equipment (UE) reachability procedures.

* * * * *

UNITED STATES PATENT AND TRADEMARK OFFICE
CERTIFICATE OF CORRECTION

PATENT NO. : 9,888,376 B2  
APPLICATION NO. : 14/318351  
DATED : February 6, 2018  
INVENTOR(S) : Luft et al.

Page 1 of 1

It is certified that error appears in the above-identified patent and that said Letters Patent is hereby corrected as shown below:

On the Title Page

On page 2, in Column 2, item (56) under "Other Publications", Line 17, delete "Requirment" and insert --Requirement-- therefor In the Claims In Column 21, Line 31, in Claim 7, delete "(CN):" and insert --(CN);-- therefor In Column 21, Line 36, in Claim 7, delete "CN:" and insert --CN;-- therefor Signed and Sealed this
Twenty-first Day of April, 2020

Andrei Iancu
*Director of the United States Patent and Trademark Office*